United States Patent [19]

Bowen

[11] 4,317,017
[45] Feb. 23, 1982

[54] MICROWAVE STEAMER

[75] Inventor: Robert F. Bowen, Burlington, Mass.

[73] Assignee: Raytheon Company, Lexington, Mass.

[21] Appl. No.: 239,970

[22] Filed: Mar. 3, 1981

[51] Int. Cl.³ .............................................. H05B 6/80
[52] U.S. Cl. ................................ 219/10.55 E; 99/450; 426/243
[58] Field of Search ................ 219/10.55 E, 10.55 M, 219/10.55 F, 10.55 R, 10.55 D; 426/243, 241, 107; 99/450

[56] References Cited

U.S. PATENT DOCUMENTS 3,230,864  1/1966  Krajewski .................... 219/10.55 E
3,985,990  10/1976  Levinson ..................... 219/10.55 M
4,280,032  7/1981  Levinson ..................... 219/10.55 E

*Primary Examiner*—Arthur T. Grimley
*Attorney, Agent, or Firm*—William R. Clark; Joseph D. Pannone; Milton D. Bartlett

[57] ABSTRACT

A utensil for steam cooking in a microwave oven. The bottom portion of the utensil is a microwave transparent dish in which water is placed. A metal pan having a plurality of holes in the bottom is supported in the dish in a fixed horizontal alignment with the bottom spaced above the water level. A tray for holding food is positioned in the pan; the tray may be inverted to provide a second support surface configuration. A metallic cover is supported by the dish and is thereby secured in a spaced overlap alignment with the pan to substantially provide a microwave choke therebetween. The water in the dish is heated by microwave energy to provide steam which passes through the holes into the cooking region. Substantially all of the available microwave energy is absorbed by the water as the food is shielded by the combination of the pan, cover, and the choke therebetween.

22 Claims, 7 Drawing Figures

MICROWAVE STEAMER

BACKGROUND OF THE INVENTION

Steaming is an ancient form of cooking. The basic principle of steaming is to place the food above boiling water so that the rising steam provides heat to the food. Generally, a lid is placed over the water reservoir in which the food is supported so that the steam does not escape from the system.

For a variety of reasons, steam cooking is very popular today. For example, a heat source may be conserved because only enough heat to boil a small amount of water is required. Also, more food vitamins and minerals are retained by steam cooking than by placing the food in boiling water. In steam cooking, the steam surrounds and gently cooks the food in moist intense heat. Steaming avoids the harsh treatment that occurs when food is placed directly in boiling water and important food content is thrown away with the cooking water. Furthermore, many people prefer the fresh color and crisp texture of food prepared by steaming.

The steamers is use today are not ideally configured for use in a microwave oven. For example, the reservoir holding the water should be transparent to microwave energy but capable of withstanding high temperatures. Also, the food should be substantially shielded from the microwave energy so that substantially all of the microwave energy is used to heat the water.

SUMMARY OF THE INVENTION

The invention discloses the combination of a microwave transparent container, the microwave reflective container having at least a portion removably positioned in the microwave transparent container. The reflective container having a perforated bottom spaced from the bottom of the microwave transparent container, and a microwave reflective lid removably supported by the microwave transparent container, the lid having a region around its periphery substantially parallel to portions of the microwave reflective container for a distance of greater than 0.5 inches in a direction perpendicular to the edge of the lid. It may be preferable that the microwave transparent container comprise polycarbonate and that the microwave reflective container and lid comprise aluminum. Furthermore, it may be preferable that the microwave transparent container define an inward ledge around the perimeter of its inside surface for supporting the microwave reflective container above the bottom of the microwave transparent container. Also, the region of the lid so defined may be spaced less than 0.25 inches from the adjacent parallel portions of the microwave reflective container. The term microwave transparent as defined herein means a material through which microwave energy can pass without significant loss. Microwave reflective means that microwave energy reflects from the surface thereof and is typically thought of as being metallic.

The invention may also be practiced by a utensil for steam cooking in a microwave oven comprising a first container having an opening, the first container being substantially transparent to microwave energy, a second container having at least a portion removably positioned in the first container, the bottom of the second container being spaced above the bottom of the first container, the bottom of the second container having a plurality of perforations, the second container being reflective to microwave energy, a cover removably supported by the first container for covering the opening of the first container, the cover being reflective to microwave energy, and means for preventing the passage of microwave energy between the second container and the cover, the means comprising a region around the periphery of the cover being substantially perpendicular to portions of the second container for a distance of greater than 0.5 inches in a direction perpendicular to the edge of the cover. The first container may comprise polycarbonate. The second container and the cover may comprise aluminum. The first container preferably has an inward ledge around its inside perimeter surface for supporting the second container above the bottom of the first container. Furthermore, the spacing between the parallel portions of the cover and the second container may preferably be less than 0.25 inches.

The invention may also disclose a utensil for steam cooking in a microwave oven comprising a microwave transparent container comprising a first container having an opening, the first container being substantially transparent to microwave energy, a second container having at least a portion removably positioned in the first container, the bottom of the second container being spaced above the bottom of the first container, the bottom of the second container having a plurality of perforations, the second container being reflective to microwave energy, and a cover removably supported by the first container overlapping portions of the second container, the overlapping portions being substantially parallel around the perimeter of the lid for a distance of greater than 0.5 inches in a direction perpendicular to the perimeter, the cover being reflective to microwave energy.

The invention discloses a utensil for steam cooking in a microwave oven comprising a microwave transparent container comprising a bottom section comprising a bottom connected to a first surface having a vertical component, the microwave transparent container further comprising an outwardly extending substantially horizontal ledge connected to the top of the first surface, the microwave transparent container further comprising a top section comprising a second surface having a vertical component connected to the outer perimeter of the ledge, a microwave reflective container removably supported on the ledge and extending upwardly having a portion above the second surface, the microwave reflective container having a plurality of perforations in the bottom, and a microwave reflective cover removably supported by the microwave transparent container, the cover overlapping the portion, the overlapping being greater than 0.5 inches and being substantially parallel in a direction perpendicular to the perimeter of the cover.

The invention further defines a utensil for steam cooking in a microwave oven comprising a microwave transparent dish having an open top, a metallic container removably supported in the dish above the bottom of the dish, the container having plurality of perforations in the bottom, a metallic lid removably supported by the dish covering the open top, and a tray removably positioned in the container, the tray being supportable in a first position or a second position inverted from the first position. It may be preferable that the first position provides a food support surface having a divider. Also, it may be preferable that the second position provides a food support surface shallower than the first position. The tray may comprise a high temperature plastic such as polycarbonate. Also, the tray may comprise a food support surface having a plurality of elongated slots wherein two slots are at an angle other than perpendicular to each other.

BRIEF DESCRIPTION OF THE DRAWINGS

The foregoing and other objects and advantages of the invention will be more fully understood by a reading of the description of the preferred embodiment with reference to the drawings wherein.

DESCRIPTION OF THE PREFERRED EMBODIMENT

Figure 1:
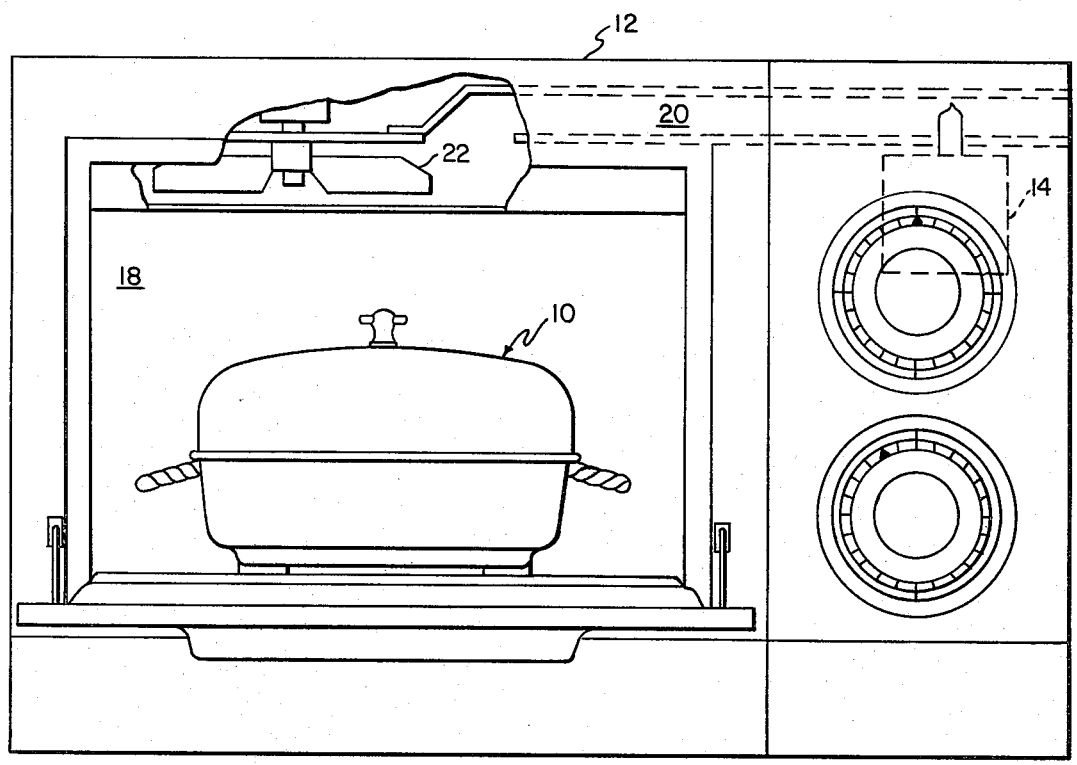
FIG. 1 is a partially cutaway front elevation of a microwave steamer positioned in a microwave oven.

Referring to FIG. 1, there is shown a microwave steamer 10 embodying the invention. The steamer 10 is positioned in a conventional microwave oven 12. Microwave energy typically having a frequency of approximately 2450 megacycles is provided by magnetron 14 which is connected to and receives DC power from a power supply (not shown). The microwave energy is coupled to cavity 18 by waveguide 20 and mode stirrer 22 or more preferably a primary radiator (not shown) having a directive pattern. Conventional microwave oven components and features such as, for example, a door seal, are not shown and described as they are well known in the art.

Figure 2:
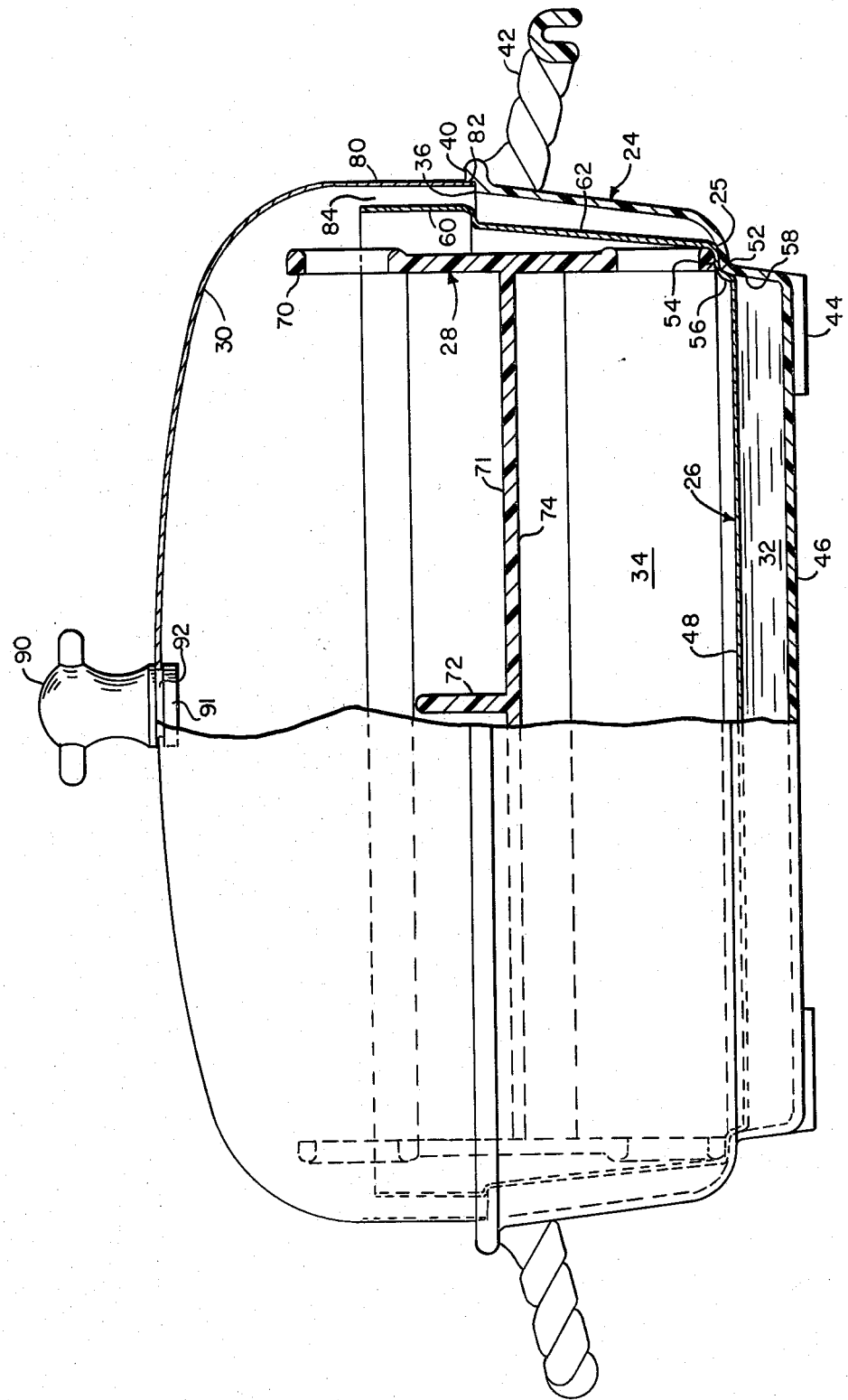
FIG. 2 is a partially cutaway front elevation view of the steamer of FIG. 1, the steamer embodying the invention.
Figure 3:
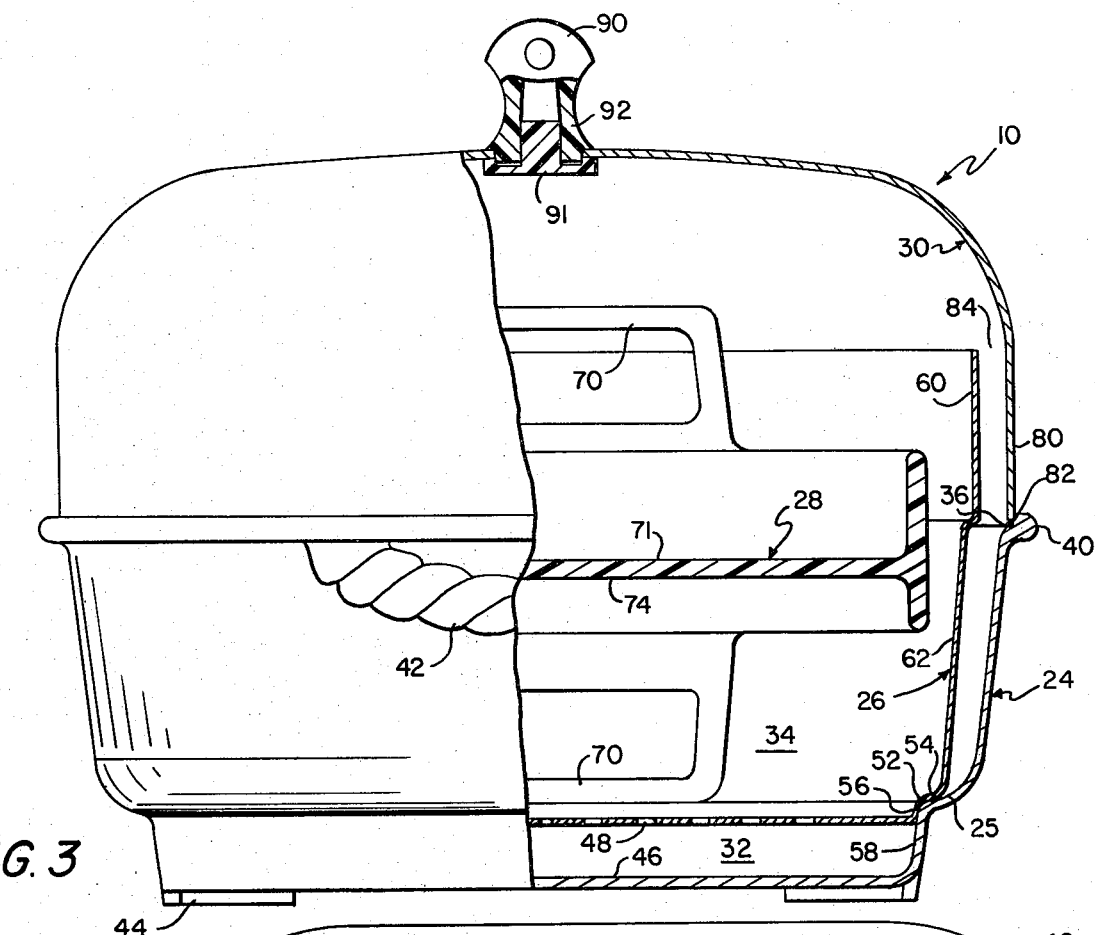
FIG. 3 is a partially cutaway end elevation view of the steamer of FIG. 2.

Referring to FIGS. 2 and 3, expanded partially cut away front and side elevation views of the microwave steamer 10 are respectively shown. The steamer includes a lower container or dish 24, a lower microwave shield or pan 26, a food tray 28, and a top microwave shield or cover 30. Steamer 10 may be used in a microwave oven to steam cook such foods as, for example, vegetables, meat, seafood, grain, and fruit. As with conventional steam cooking utensils, the food is elevated above boiling water and is exposed only to the steam. Steamer 10 provides for the water being heated by microwave energy while the food is shielded; accordingly, the food is not cooked directly by the microwave energy and substantially all of the available microwave energy is used to heat the water.

Dish 24 is made of polycarbonate. Other microwave transparent materials could be used but they must also exhibit the high temperature resistive properties of polycarbonate. More specifically, as described later herein, water which is positioned in the bottom reservoir 32 of dish 24 is heated with microwave energy to boiling; accordingly, it is important that the material of dish 24 be resistant to temperatures on the order of 212° and preferably higher for a degree of margin. Furthermore, polycarbonate provides a material that is strong and relatively resistant to impact.

Figure 4:
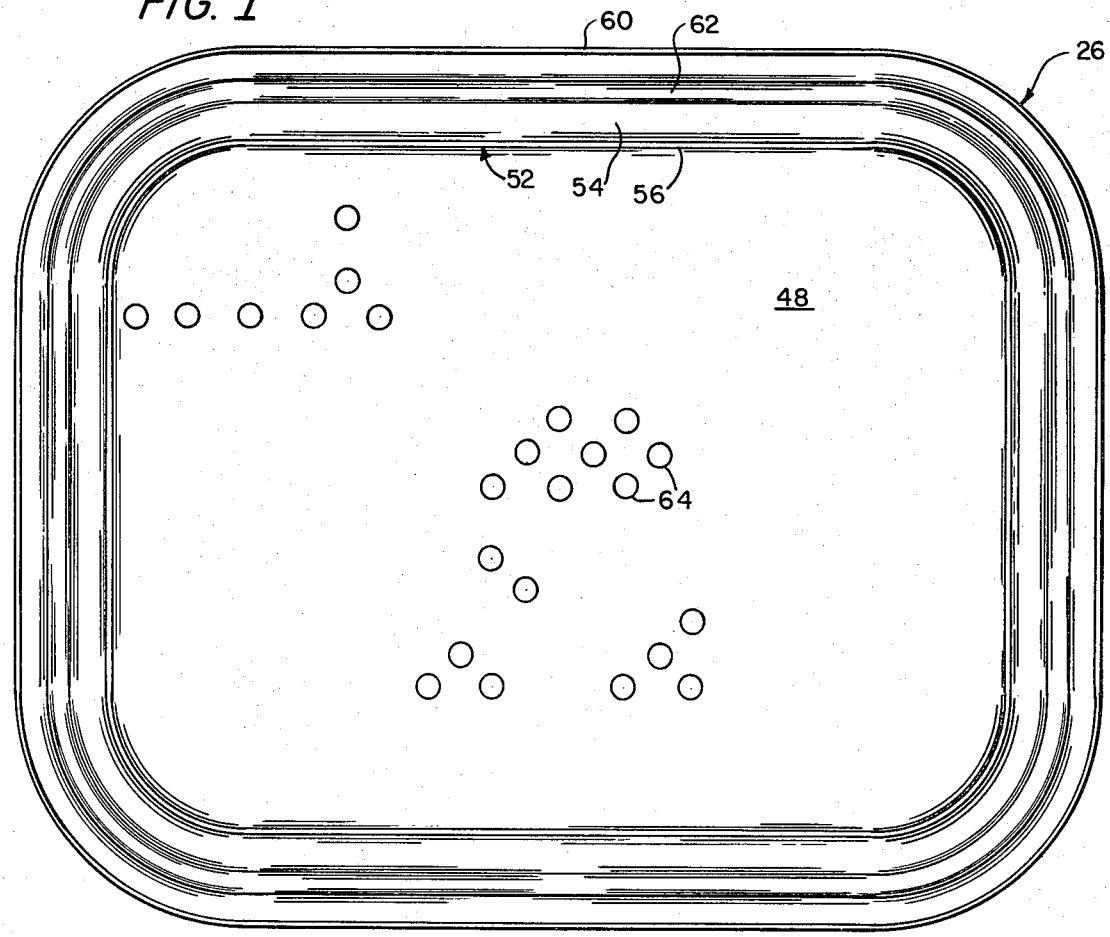
FIG. 4 is a top view of the pan shown as part of the steamer in FIG. 2.

A substantially horizontal ledge 25 defines the boundary between an upper and lower section of dish 24. The lower section or reservoir 32 contains the water during operation of the steamer. The top section 34 is where pan 26 is positioned. The opposite sides of horizontal cross-sections of either reservoir 32 or top section 34 are substantially parallel and the corners are rounded as shown in FIG. 4. In an example embodiment having an advantageous size adapted for steaming vegetables, the reservoir 32 may have approximate side dimensions of 6×8 inches with a slightly outwardly tapered height in the range from 0.5 to 1 inch. The bottom of top section 34 may have side dimensions of approximately 7.4×9.4 inches with an outwardly tapered height of approximately 2.5 inches to approximate side dimensions of 7.8×9.8 inches. Ledge 36 is provided so that cover 30 may be seated thereon to form a fixed spaced relationship between cover 30 and pan 26. Preferably, ledge 36 may define a band having a horizontal dimension of approximately 0.2 inches around the lip of dish 24. A raised edge 40 around the outer perimeter of ledge 36 prevents movement of cover 30 in the horizontal plane when seated on dish 24. Molded handles 42 on opposing lengthwise ends of the dish are used to lift steamer 10; the handles as shown in FIG. 2 are simulated manila rope which provides ornamentation. Handles 42 may be hollow as shown to reduce the weight and materials of steamer 10. A protruding base 44 or legs on the bottom surface 46 of the dish provide some thermal isolation between dish 24 and any supporting structure.

Pan 26 is fabricated of aluminum although other metals or microwave reflective materials could be used. The bottom 48 of the pan protrudes over most of its surface area to form a perimeter step 52 adapted for seating against ledge 25 of the dish. Accordingly, when pan 26 is positioned in dish 24 as shown in FIG. 2, the protrusion of the bottom 48 fits into reservoir 32 of the dish and the horizontal member 54 of step 52 is supported by ledge 25. Furthermore, the vertical member 56 of step 52 tapers inward at an angle of approximately 15 degrees from cross-sectional dimensions approximately equal to the corresponding upper cross-sectional dimensions of the reservoir. Accordingly, when seated in position, the pan is substantially prevented from movement in a horizontal direction with respect to the dish. In other words, mating of step 52 against ledge 31 and the side 58 of reservoir couples the pan and the dish into a fixed relationship. Furthermore, this fixed relationship defines a fixed spaced relationship of an upper section 60 of pan and ledge 36 of the dish. Although it may be preferable that the sides 62 of pan 26 taper outwardly from step 52, dish 24 may taper outwardly at a larger angle. Upper section 60 has a larger horizontal cross-section than the adjacent portion of the pan. When the pan is seated in the dish, upper section 60 rises above edge 40 of the dish. This provides a surface to grip for removing the pan from the dish, and also, more importantly, it provides a surface for substantially forming a microwave choke in combination with cover 30 as will be described later herein.

Referring to FIG. 4, pan 26 has a plurality of apertures 64 in the bottom to provide a path for steam. It may be preferable that each aperture have a diameter of 3/16 of an inch and they be positioned with staggered 9/32 inch centers. An aperture with a 3/16 inch diameter is smaller than the cutoff diameter for microwave energy at 2450 megacycles. Accordingly, microwave energy will not pass through the apertures. Referring again to FIGS. 2 and 3, pan 26, as has been described, is supported around its perimeter without any support columns or legs coupled between the bottom 48 and the bottom surface 46 of the dish. In a development configuration of steamer 10, columns were used to support the pan but it was found that when water was poured into reservoir 32 and exposed to microwave energy, a strong microwave energy field developed between the bottom 48 of the pan and the water surface, thereby causing the support columns to rise to a particularly high temperature.

Figure 5:
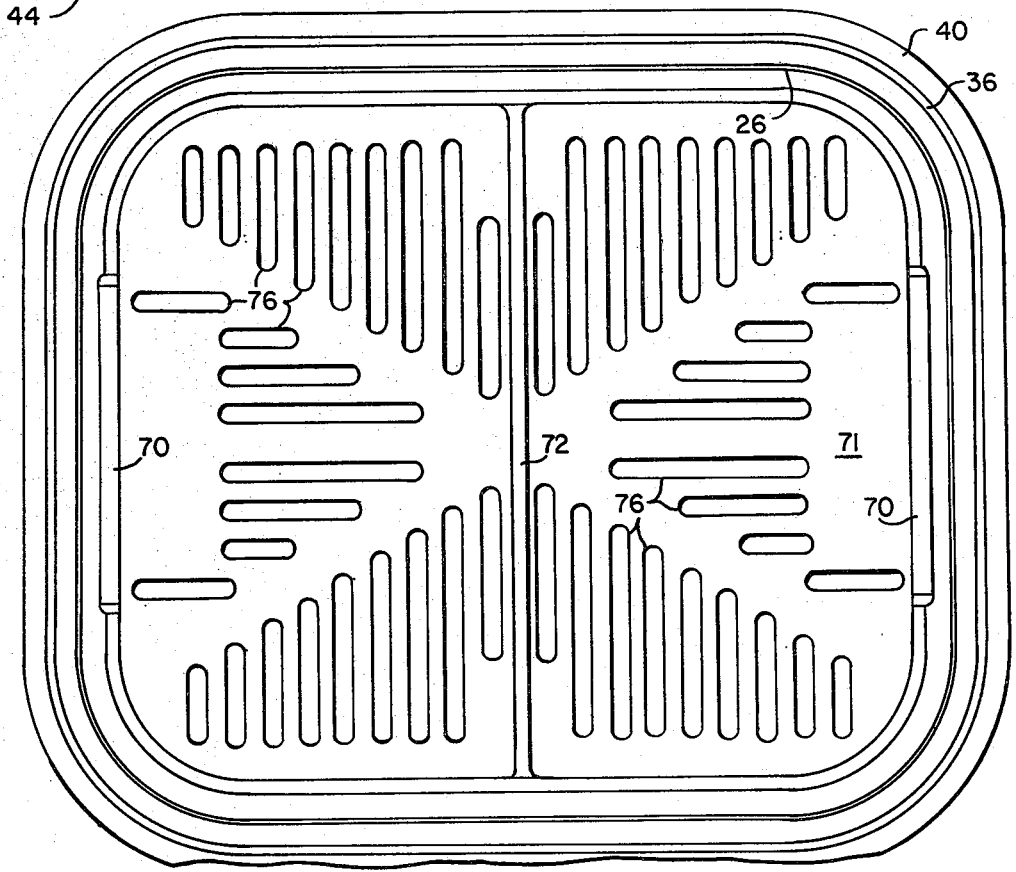
FIG. 5 is a top view of the tray shown in the steamer of FIG. 2, said tray being positioned in the steamer.
Figure 6:
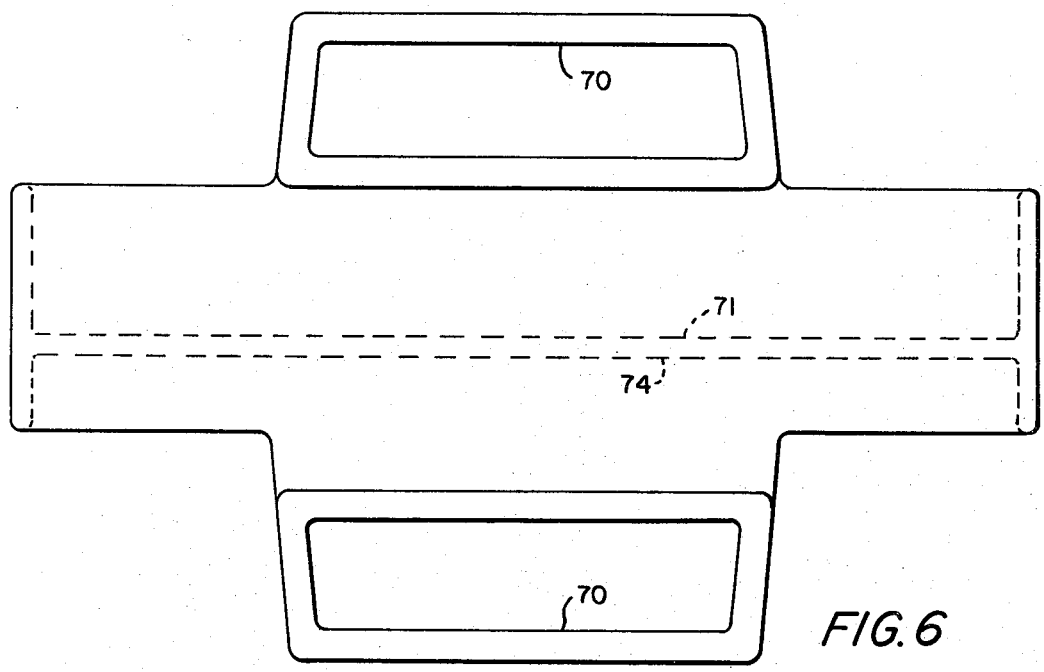
FIG. 6 is an end elevation view of the tray shown in the steamer of FIG. 2.

Tray 28 is fabricated of polycarbonate. Because the tray is not exposed to microwave energy in operation, the tray need not exhibit any particular microwave properties. Tray 28 is, however, subjected to steam and therefore must be resistant to temperatures on the order of boiling water. Still referring to FIGS. 2 and 3 also to FIGS. 5 and 6 which show top and end elevation views of the tray, it is noted that the tray is reversible. On one side 71 as shown best in FIG. 2, a divider 72 separates the tray into two different food sections. Tray 28 may also be turned over so that the other side 74 is on top. Side 74 is more shallow than side 71 so as to provide easy access using a utensil such as a spatula. Originally, two stacked trays were used but it was found that the single reversible tray providing both surface configurations could be fabricated much less expensively. Pairs of handles 70 are provided on both sides of the tray. One pair of handles functions as handles while the other pair of handles functions as supports for the tray against horizontal members 54 of step 52. When the tray is inverted, the functions of the pairs of handles are reversed. Referring specifically to FIG. 5, the pattern of or slots 76 in tray 28 are shown. The tray may be fabricated by injection molding wherein it is desirable to provide a form having somewhat equal resistances to injection in every direction. The designs shown in FIG. 5 provides this advantageous design. The function of the slots as will be described later herein is to provide a path for steam to the food.

Figure 7:
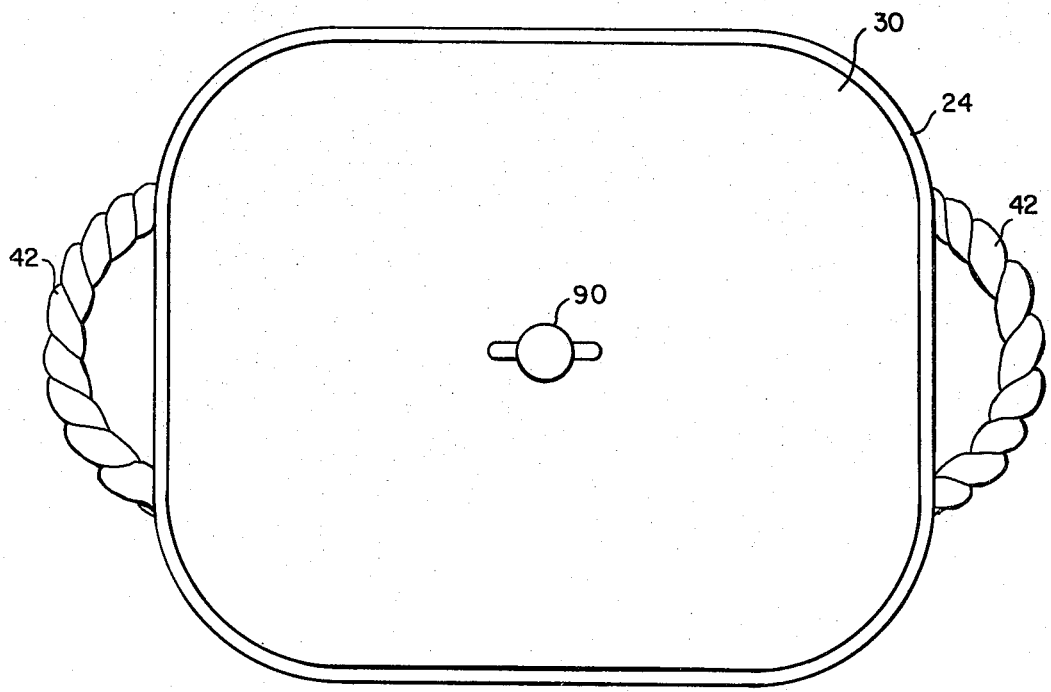
FIG. 7 is a top view of the steamer of FIG. 2.

Referring again to FIGS. 2 and 3 also to FIG. 7, cover 30 is shown in cutaway side and end views and a top view, respectively. Cover 30 is fabricated of aluminum and provides a shield for microwave energy directed down towards the interior of steamer 10. Also, the sides 80 of cover 30 substantially form a microwave choke in combination with upper section 60 of pan 26. Edge 82 of cover 30 seats onto ledge 36 of the dish and raised edge 40 prevents horizontal movement of the cover with respect to the dish. Because the pan 26 and dish 24 are secured in a fixed relationship at step 52 and the cover 30 and dish 24 are held in a fixed relationship at ledge 36, the pan and the cover are also held in a fixed relationship. It is important that the gap 84 in the overlap between the pan and the cover be maintained substantially the same around the perimeter of the two. It is desirable that the surfaces be parallel in a direction perpendicular to the perimeters of the pan and cover but a slight deviation therefrom may be acceptable. In design, a gap of approximately 5/32 of an inch plus or minus 0.010 inches was obtained. Generally, more substantial choking is provided by decreasing the spacing of the gap. However, a certain spacing should be maintained to prevent arcing between the surfaces. Furthermore, it is preferable that the substantially parallel surfaces overlap by a distance which is an odd multiple of a quarter wavelength of the microwave energy. Less precisely, it may be preferable that the overlap distance be greater than one inch. Gap 84 provides very high resistance for microwave energy and accordingly provides a substantial choke. In laboratory tests run, in a no load microwave oven condition, the temperature of a cup of water placed inside steamer 10 on tray 28 raised only five degrees in five minutes with 700 watts radiated. It is also noted that a portion if not substantially all of the temperature rise can be attributed to conduction from a support plate in the oven and convection from a blower cooling the magnetron. Accordingly, food placed in steamer 10 is substantially shielded from microwave energy by cover 30, pan 26, and the substantial choke formed by the overlap surfaces of the two. Handle 90 is fabricated of a microwave transparent material such as polycarbonate and is used for lifting the cover off of the steamer 10. It is preferable that handle 90 have a low thermal conductivity. Handle 90 is attached by a threaded microwave transparent bolt 91 extending from the inside of the cover through a circular hole 92 having a diameter of less than microwave cutoff. In an alternate embodiment, bolt 91 may be a plug that is ultrasonically welded to handle 90.

In operation, water is placed into the reservoir of dish 24. After the pan 26 is seated into position in the dish, the tray 28 is positioned inside the pan as shown in FIGS. 2 and 3, food is placed thereon. After the cover 30 is positioned over the dish to complete the microwave shielding of the food, steamer 10 is placed in a microwave oven and the cavity is energized with microwave energy. The water in the reservoir is heated by microwave energy that passes through the microwave transparent dish. The food inside the cover-pan combination, however, is shielded from microwave energy. When the water heats to boiling, steam rising therefrom passes through apertures in the pan and slots in the tray to cook the food.

On the one hand, it is preferable to put a relatively small amount of water such as, for example, less than one cup, in the reservoir so that steam will begin to rise and the heating process commenced as quickly as possible. On the other hand, however, it may be preferable to put a larger amount of water in the reservoir so as to insure a margin of safety against operating the microwave oven in a no load condition after the water evaporates from the reservoir. Steamer 10 provides for safety while using only a relatively small amount of water. More specifically, the rising steam condenses on cover 30 which is cooler than the water vapor. The shape of cover 30 is slightly tapered downward as shown in FIGS. 2 and 3 so that the condensed water may run down the side of the cover, through gap 84, and down the side of dish 24. Because of production tolerances, there is some spacing at different points around the dish between the pan and the dish so that the water can complete the cycle back down into the reservoir.

This concludes the description of the preferred embodiment. The reading of it by one skilled in the art will bring to mind many modifications and alterations without departing from the spirit and scope of the invention. Accordingly, it is intended that the invention be limited in scope only by the appended claims.

What is claimed is:

1. In combination:
   a microwave transparent container;
   a microwave reflective container having at least a portion removably positioned in said microwave transparent container, said microwave reflective container having a perforated bottom spaced from the bottom of said microwave transparent container; and a microwave reflective lid removably supported by said microwave transparent container, said lid having a region around its periphery substantially parallel to portions of said microwave reflective container for a distance of greater than 0.5 inches in a direction perpendicular to the edge of said lid.

2. The combination in accordance with claim 1 wherein said microwave transparent container comprises polycarbonate.

3. The combination in accordance with claim 1 wherein said microwave reflective container comprises aluminum.

4. The combination in accordance with claim 1 wherein said microwave reflective lid comprises aluminum.

5. The combination in accordance with claim 1 wherein said microwave transparent container defines an inward ledge around the perimeter of its inside surface for supporting said microwave reflective container above the bottom of said microwave transparent container.

6. The combination in accordance with claim 1 said region is spaced less than 0.25 inches from said portions of said microwave reflective container.

7. A utensil for steam cooking in a microwave oven comprising:
a first container having an opening, said first container being substantially transparent to microwave energy;
a second container having at least a portion removably positioned in said first container, the bottom of said second container being spaced above the bottom of said first container, said bottom of said second container having a plurality of perforations, said second container being reflective to microwave energy;
a cover removably supported by said first container for covering said opening, said cover being reflective to microwave energy; and
means for preventing the passage of microwave energy between said second container and said cover, said means comprising a region around the periphery of said cover being substantially perpendicular to portions of said second container for a distance of greater than 0.5 inches in a direction perpendicular to the edge of said cover.

8. The utensil recited in claim 7 wherein said first container comprises polycarbonate.

9. The utensil recited in claim 7 wherein said second container comprises aluminum.

10. The utensil recited in claim 7 wherein said cover comprises aluminum.

11. The utensil recited in claim 7 wherein said first container has an inward ledge around its inside perimeter surface for supporting said second container above said bottom of said first container.

12. The utensil recited in claim 7 wherein said portion is spaced less than 0.25 inches from said portions of said second container.

13. A utensil for steam cooking in a microwave oven comprising:
a microwave transparent container comprising a first container having an opening, said first container being substantially transparent to microwave energy;
a second container having at least a portion removably positioned in said first container, the bottom of said second container being spaced above the bottom of said first container, said bottom of said second container having a plurality of perforations, said second container being reflective to microwave energy; and
a cover removably supported by said first container overlapping portions of said second container, said overlapping portions being substantially parallel around the perimeter of said lid for a distance of greater than 0.5 inches in a direction perpendicular to said perimeter, said cover being reflective to microwave energy.

14. The utensil recited in claim 13 wherein said first container comprises polycarbonate.

15. The utensil recited in claim 13 wherein the spacing between said parallel portions is less than 0.25 inches.

16. A utensil for steam cooking in a microwave oven comprising:
a microwave transparent container comprising a bottom section comprising a bottom connected to a first surface having a vertical component;
said microwave transparent container further comprising an outwardly extending substantially horizontal ledge connected to the top of said first surface;
said microwave transparent container further comprising a top section comprising a second surface having a vertical component connected to the outer perimeter of said ledge;
a microwave reflective container removably supported on said ledge and extending upwardly having a portion above said second surface, said microwave reflective container having a plurality of perforations in the bottom; and
a microwave reflective cover removably supported by said microwave transparent container, said cover overlapping said portion, said overlapping being greater than 0.5 inches and being substantially parallel in a direction perpendicular to the perimeter of said cover.

17. The utensil recited in claim 16 wherein said portion and said parallel region of said cover are spaced less than 0.25 inches.

18. A utensil for steam cooking in a microwave oven comprising:
a microwave transparent dish having an open top;
a metallic container removably supported in said dish above the bottom of said dish, said container having a plurality of perforations in the bottom;
a metallic lid removably supported by said dish covering said open top; and
a tray removably positioned in said container, said tray being supportable in a first position or a second position inverted from said first position.

19. The utensil recited in claim 18 wherein said first position provides a food support surface having a divider.

20. The utensil recited in claim 20 wherein said second position provides a food support surface shallower than said first position.

21. The utensil recited in claim 18 wherein said tray comprises a high temperature plastic.

22. The utensil recited in claim 18 wherein said tray comprises a food support surface having a plurality of elongated slots wherein two slots are at an angle other than perpendicular to each other.

* * * * *